US012627167B2

(12) United States Patent
Wakazono et al.

(10) Patent No.: US 12,627,167 B2
(45) Date of Patent: May 12, 2026

(54) POWER FEED CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Keisuke Wakazono, Yokkaichi (JP); Kazuki Masuda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 39 days.

(21) Appl. No.: 18/711,547

(22) PCT Filed: May 24, 2022

(86) PCT No.: PCT/JP2022/021298
§ 371 (c)(1),
(2) Date: May 17, 2024

(87) PCT Pub. No.: WO2023/228287
PCT Pub. Date: Nov. 30, 2023

(65) Prior Publication Data
US 2025/0023385 A1 Jan. 16, 2025

(51) Int. Cl.
*H02J 9/06* (2006.01)
*B60L 3/00* (2019.01)

(52) U.S. Cl.
CPC ............ *H02J 9/068* (2020.01); *B60L 3/0046* (2013.01)

(58) Field of Classification Search
CPC .............................. H02J 9/068; B60L 3/0046
See application file for complete search history.

(56) References Cited

U.S. PATENT DOCUMENTS 11,201,498 B2 12/2021 Wataru
11,652,361 B1 * 5/2023 Matsumoto ............. B60L 1/003
307/23

(Continued)

FOREIGN PATENT DOCUMENTS

JP 2008-289270 A 11/2008
JP 2019-004560 A 1/2019

(Continued)

OTHER PUBLICATIONS

International Search Report and Written Opinion for PCT/JP2022/021298, dated Nov. 30, 2023.

*Primary Examiner* — Daniel Cavallari
*Assistant Examiner* — Duc M Pham
(74) *Attorney, Agent, or Firm* — Brooks Kushman P.C.

(57) ABSTRACT

A power feed control device includes a voltage conversion unit performs a conversion operation of increasing or decreasing an input voltage based on power from a power storage unit. An element unit is configured to allow a current to flow to a power path side via itself, and to be able to block a current from flowing to the power storage unit side via itself. A second conductive path is electrically connected to a conductive path disposed between a switch unit and the voltage conversion unit or between the switch unit and the power path. The switch unit blocks a current from flowing from the power path to a third conductive path when the switch unit is in an OFF state, and allows energization via the switch unit between the third conductive path and the power path when the switch unit is in an ON state.

12 Claims, 5 Drawing Sheets

(56) References Cited

U.S. PATENT DOCUMENTS

| 2019/0103758 | A1 | | 4/2019 | Fukua | |
|---|---|---|---|---|---|
| 2019/0312449 | A1 | | 10/2019 | Matsushita | |
| 2021/0229610 | A1 | | 7/2021 | Shimamoto et al. | |
| 2023/0192017 | A1 | * | 6/2023 | Mitani | H02J 7/00 |
| | | | | | 307/23 |
| 2023/0198290 | A1 | * | 6/2023 | Kobayashi | B60L 58/14 |
| | | | | | 307/23 |
| 2024/0149811 | A1 | * | 5/2024 | Morita | H02M 3/00 |

FOREIGN PATENT DOCUMENTS

| JP | 6451708 | B2 | 1/2019 |
|---|---|---|---|
| JP | 2019-187062 | A | 10/2019 |
| JP | 2019-193493 | A | 10/2019 |
| JP | 2020-182318 | A | 11/2020 |
| WO | 2021/235444 | A1 | 11/2021 |

* cited by examiner

Fig. 5

POWER FEED CONTROL DEVICE

CROSS-REFERENCE TO RELATED APPLICATIONS

This application is the U.S. national stage of PCT/JP2022/021298 filed on May 24, 2022, the contents of which are incorporated herein.

TECHNICAL FIELD

The present disclosure relates to a power feed control device.

BACKGROUND

JP 2020-182318 A discloses a power supply system. The power supply system of JP 2020-182318 A includes a main battery and a sub battery, and operates to switch a power supply source to a load from the main battery side to the sub battery side when power supply from the main battery side is interrupted. In the power supply system of JP 2020-182318 A, a body diode is provided in a switch between the sub battery and the load, and when power from the main battery is interrupted, power is supplied to the load via the body diode even when the switch is in an OFF state, so that the power supply is not interrupted.

In the power supply system of JP 2020-182318 A, there is a concern that an appropriate voltage cannot be supplied to the load when the output voltage of the sub battery decreases.

SUMMARY

The present disclosure provides a technology in which, in a power feed control device capable of performing a backup operation of supplying power based on a power storage unit different from a power supply unit, power is easily supplied more quickly during the backup operation, and an appropriate voltage is easily output even when an output voltage of the power storage unit changes.

A power feed control device according to one aspect of the present disclosure is a power feed control device used in an in-vehicle system including a power supply unit that supplies power, a power path that is a path through which power based on the power supply unit is transmitted, and a power storage unit different from the power supply unit, the power feed control device controlling power feeding from the power storage unit, the power feed control device including: a first conductive path to which a voltage based on an output of the power storage unit is applied; an element unit of which one end is electrically connected to the first conductive path; a second conductive path electrically connected to the other end of the element unit and forming an energization path between the element unit and the power path; a voltage conversion unit connected in parallel to the element unit between the power storage unit and the power path, the voltage conversion unit performing a conversion operation of increasing or decreasing an input voltage based on power from the power storage unit; a third conductive path electrically connected to the voltage conversion unit between the voltage conversion unit and the power path; a switch unit provided between the third conductive path and the power path; and a control unit that controls the voltage conversion unit, in which the element unit is configured to be able to allow a current to flow to the power path side via the element unit, and is configured to be able to block a current from flowing to the power storage unit side via the element unit, in which the second conductive path is electrically connected to a conductive path disposed between the switch unit and the voltage conversion unit or between the switch unit and the power path, and in which the switch unit blocks a current from flowing from the power path to the third conductive path when the switch unit is in an OFF state, and allows energization through the switch unit between the third conductive path and the power path when the switch unit is in an ON state.

Advantageous Effects

The technology according to the present disclosure can easily supply power more quickly during a backup operation, and can easily output an appropriate voltage even when the output voltage of the power storage unit changes.

Figure 3:
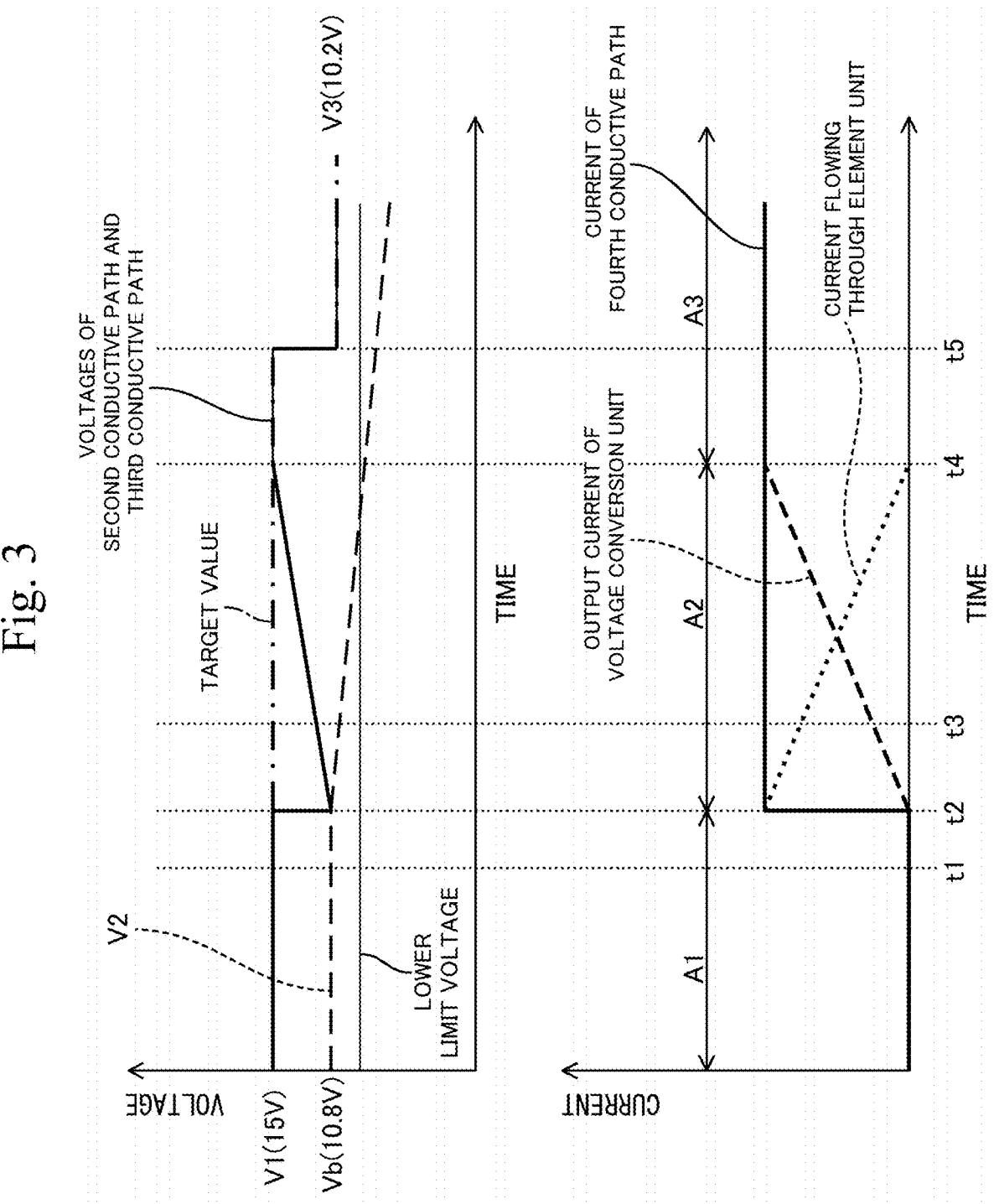

An upper part of FIG. 3 is a graph showing a change in voltage when backup control is performed, and a lower part of FIG. 3 is a graph showing a change in current when backup control is performed.

Figure 4:
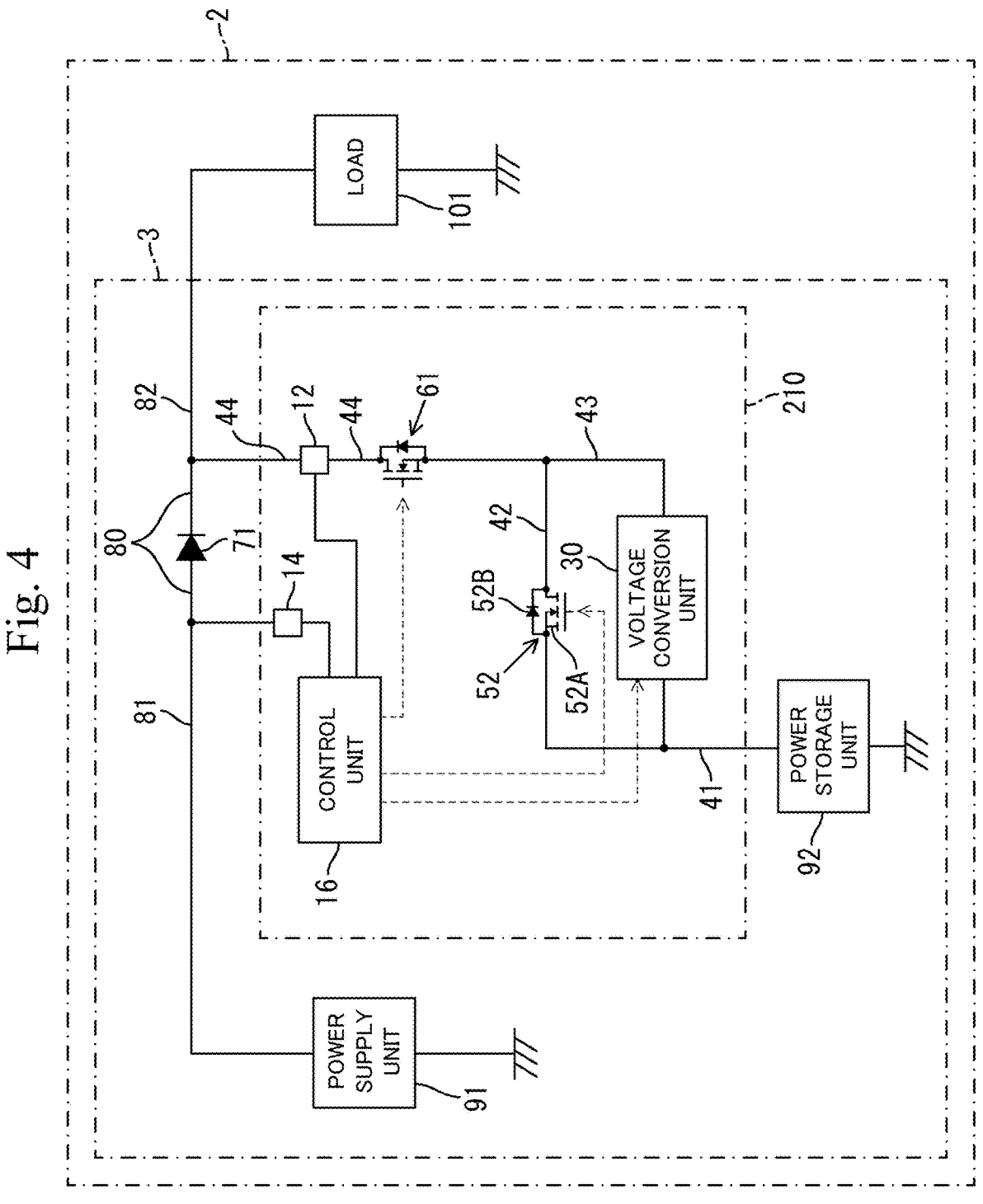

FIG. 4 is a circuit diagram schematically illustrating an example of an in-vehicle system including a power feed control device according to a second embodiment.

Figure 5:
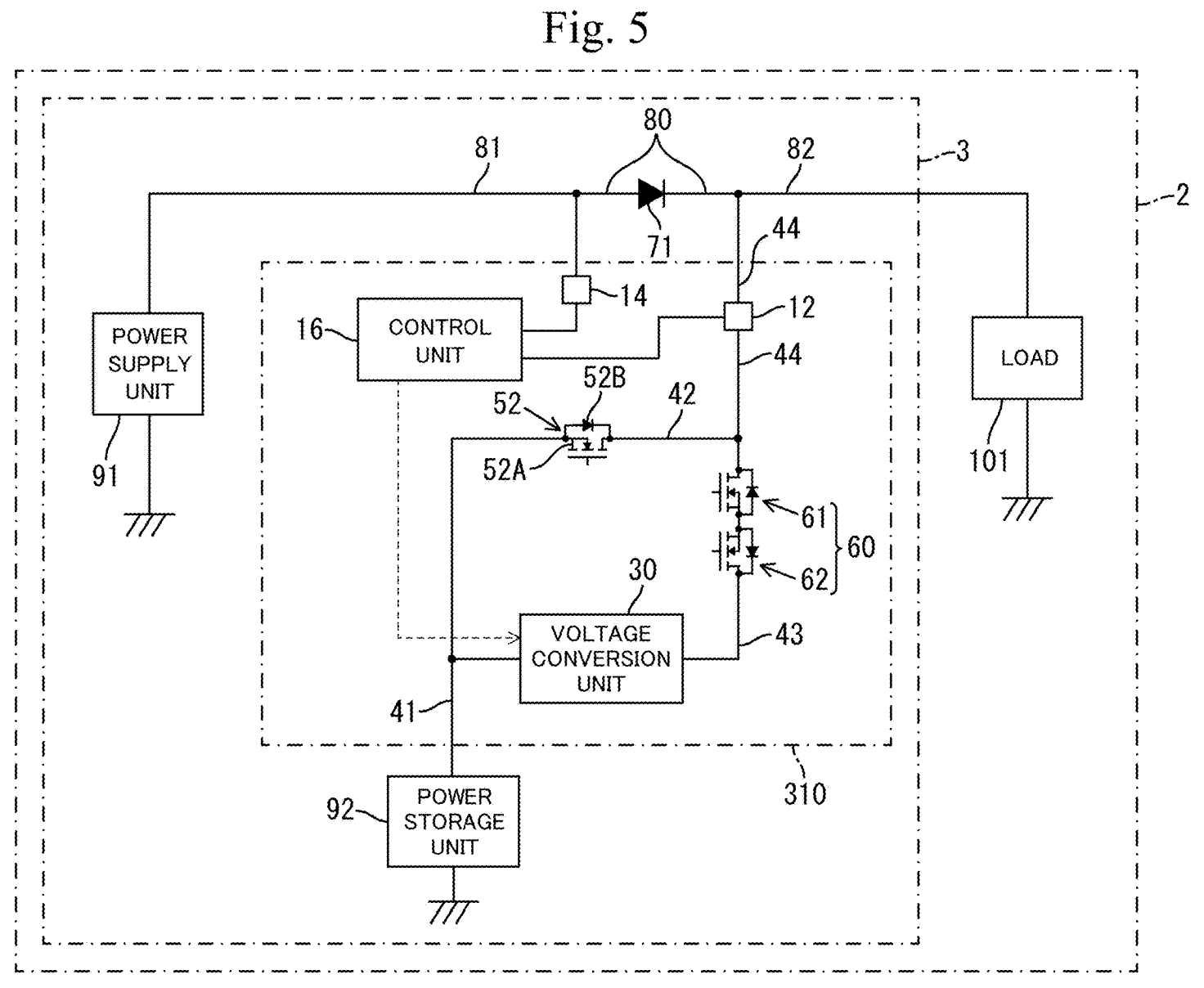

FIG. 5 is a circuit diagram schematically illustrating an example of an in-vehicle system including a power feed control device according to a third embodiment.

DETAILED DESCRIPTION OF PREFERRED EMBODIMENTS

Hereinafter, embodiments according to the present disclosure will be listed and exemplified. Note that the features of [1] to [12] exemplified below may be combined in any way in a consistent combination.

[1] A power feed control device used in an in-vehicle system including a power supply unit that supplies power, a power path that is a path through which power based on the power supply unit is transmitted, and a power storage unit different from the power supply unit, the power feed control device controlling power feeding from the power storage unit, the power feed control device including: a first conductive path to which a voltage based on an output of the power storage unit is applied; an element unit of which one end is electrically connected to the first conductive path; a second conductive path electrically connected to the other end of the element unit and forming an energization path between the element unit and the power path; a voltage conversion unit connected in parallel to the element unit between the power storage unit and the power path, the voltage conversion unit performing a conversion operation of increasing or decreasing an input voltage based on power from the power storage unit; a third conductive path electrically connected to the voltage conversion unit between the voltage conversion unit and the power path; a switch unit provided between the third conductive path and the power path; and a control unit that controls the voltage conversion unit, in which the element unit is configured to be able to allow a current to flow to the power path side via the element unit, and is configured to be able to block a current from flowing to the power storage unit side via the element unit, in which the second conductive path is electrically connected to a conductive path disposed between the switch unit and the voltage conversion unit or between the switch unit and the power path, and in which the switch unit blocks a current from flowing from the power path to the third conductive path when the switch unit is in an OFF state, and allows energization through the switch unit between the third conductive path and the power path when the switch unit is in an ON state.

When performing a backup operation of supplying power based on the power storage unit, the power feed control device of [1] can use a path via the element unit and a path via the voltage conversion unit. For example, at a time when sufficient power supply is not performed by the path via the voltage conversion unit, the power feed control device can respond to promptly supply power using the path via the element unit. On the other hand, when the output voltage of the power storage unit decreases, it is possible to perform a voltage increasing operation by the voltage conversion unit and perform a backup operation so as to apply a desired output voltage to the third conductive path. Furthermore, when the switch unit is in the OFF state, the power feed control device can block inflow of the current from the power path side to the voltage conversion unit side, and when the switch unit is in the ON state, it is possible to reduce the loss when feeding the current toward the power path.

[2] The power feed control device according to [1], in which, when power supply from the power supply unit to the power path becomes a failure state, the control unit switch the switch unit to the ON state, and also causes the voltage conversion unit to perform the conversion operation so as to apply an output voltage of a first value to the third conductive path, in which, when a voltage of the second conductive path is equal to or less than a second value in the failure state, a current flows from the power storage unit side to the power path side via the element unit, and in which a current is blocked from flowing in the element unit from the second conductive path side to the power storage unit side at least after the failure state occurs.

The power feed control device of [2] is configured such that a current flows from the power storage unit side to the power path side via the element unit when the voltage of the second conductive path is equal to or less than the second value in the failure state. That is, at a time when the output of the voltage conversion unit does not rise to "the extent that the voltage of the second conductive path exceeds the second value", the power based on the power storage unit can be supplied to the power path side via the element unit, so that the current can be supplemented by the path via the element unit at a time when the output of the voltage conversion unit is low. Furthermore, when the supply of power from the power supply unit to the power path is in the normal state that is not the failure state, the control unit can set the switch unit in the OFF state. This can block the current from flowing from the power path side into the voltage conversion unit side. Furthermore, at least after the failure state occurs, it is possible to block the current from flowing in the element unit from the second conductive path side to the power storage unit side, and therefore, while such a blocking function is exerted, it is possible to prevent the current based on the output from the voltage conversion unit from flowing from the second conductive path side into the power storage unit side.

[3] The power feed control device according to [2], in which, in a case where the failure state occurs, the control unit causes the voltage conversion unit to perform the conversion operation of applying the output voltage of the first value to the third conductive path, and then causes the voltage conversion unit to perform the conversion operation of applying the output voltage of a third value smaller than the first value to the third conductive path.

When the failure state occurs, the power feed control device of [3] can perform voltage conversion so as to apply an output voltage of the first value to the third conductive path, and then switch the voltage conversion so as to apply an output voltage of the third value which is less than the first value. Therefore, after a certain period of time has elapsed, the power feed control device can reduce the voltage output from the voltage conversion unit to reduce the output energy.

[4] The power feed control device according to [3], in which the second conductive path and the third conductive path are short-circuited via or without via the switch unit when the switch unit is in an ON state, in which the second value is a value obtained by subtracting, from a value of a voltage applied to the first conductive path, a value of a voltage drop generated in the element unit, in which the first value is larger than the second value, and in which the third value is smaller than the first value and larger than the second value.

When the failure state occurs, the power feed control device of [4] can perform voltage conversion so as to apply the output voltage of the first value larger than the second value, and can operate so as to bring the voltage of the third conductive path close to a relatively high target voltage (first value) at an early stage. Then, after a certain period of time has elapsed from the failure state, the power feed control device can reduce the output energy by reducing the voltage output from the voltage conversion unit to the third value, and can inhibit inflow of the current via the element unit by setting the third value to be a value larger than the second value.

[5] The power feed control device according to [3], in which the second conductive path and the third conductive path are short-circuited via or without via the switch unit when the switch unit is in an ON state, in which the second value is a value obtained by subtracting, from a value of a voltage applied to the first conductive path, a value of a voltage drop generated in the element unit when a current flows from the first conductive path to the second conductive path in the element unit, and in which the third value is smaller than the first value and smaller than the second value.

In the power feed control device of [5], after a certain period of time has elapsed from the failure state, the output energy can be reduced by reducing the voltage output from the voltage conversion unit to the third value, and the output energy can be further reduced by setting the third value to a value smaller than the second value.

[6] The power feed control device according to [4], in which the element unit includes a diode and an opening/closing unit provided in parallel to the diode, in which a voltage based on an output of the power storage unit is applied to an anode of the diode, in which a cathode of the diode is electrically connected to the second conductive path, in which bidirectional energization is allowed when the opening/closing unit is in an ON state, in which, when the opening/closing unit is in an ON state, the second value is a first subtraction value obtained by subtracting, from a value of a voltage applied to the first conductive path, a value of a voltage drop generated in the opening/closing unit and the diode, and when the opening/closing unit is in an OFF state, the second value is a second subtraction value obtained by subtracting, from a value of a voltage applied to the first conductive path, a value of a voltage drop generated in the diode, in which the first value is larger than either the first subtraction value or the second subtraction value, in which, when supply of power from the power supply unit to the power path is changed from a normal state that is not the failure state to the failure state, the control unit sets the switch unit in the ON state and sets the opening/closing unit in the ON state, then after switching the switch unit to the ON state, the control unit switches the opening/closing unit to the OFF state when a predetermined condition is satisfied while the voltage conversion unit is performing the conversion operation, and then after switching the opening/closing unit to the OFF state, the control unit causes the voltage conversion unit to perform the conversion operation of applying the output voltage of the third value to the third conductive path, and in which the third value is larger than the second subtraction value.

In the power feed control device of [6], the element unit is configured such that the diode and the opening/closing unit are provided in parallel, the anode of the diode is connected to the first conductive path, and the cathode is connected to the second conductive path. Therefore, in the element unit, even when the opening/closing unit is in the OFF state, when the voltage of the second conductive path is less than the voltage of the first conductive path by a certain value or more, the current is continuously permitted to flow from the first conductive path to the second conductive path, and when the opening/closing unit is in the ON state, energization via the opening/closing unit is permitted. Furthermore, when the normal state is changed to the failure state, the power feed control device sets the opening/closing unit in the ON state, so that larger electric power can be supplied at an earlier stage via the element unit while reducing the loss in the element unit. Furthermore, after switching the switch unit to the ON state, the power feed control device switches the opening/closing unit to the OFF state in response to satisfaction of a predetermined condition during the conversion operation. Therefore, after the voltage conversion operation progresses until the predetermined condition is satisfied, the power feed control device can prevent the current from flowing back in the element unit. Furthermore, after switching the opening/closing unit 52A to the OFF state, the power feed control device causes the voltage conversion unit to perform a conversion operation of applying an output voltage of the third value (a value smaller than the first value and larger than the second subtraction value) to the third conductive path. Therefore, after a certain period of time has elapsed, the power feed control device can continue the power supply by the output operation of the voltage conversion unit with reduced energy while reliably reducing the current in the forward direction in the diode.

[7] The power feed control device according to [6], in which the predetermined condition is that the voltage of the second conductive path has reached a predetermined value equal to or more than a voltage of the first conductive path.

In the power feed control device of [7], after the failure state, it is possible to continue energization via the opening/closing unit until the voltage of the second conductive path rises, and after the voltage has risen, it is possible to reliably prevent backflow in the element unit.

[8] The power feed control device according to [6], in which the predetermined condition is that a predetermined time has elapsed since the voltage conversion unit starts to output a current to the third conductive path after the failure state.

In the power feed control device of [8], after the failure state, it is possible to continue energization via the opening/closing unit until a predetermined time elapses after the voltage conversion unit starts to output the current, and after the predetermined time has elapsed, it is possible to reliably prevent backflow in the element unit.

[9] The power feed control device according to [6], in which the predetermined condition is that a current flowing through the element unit has reached a lower limit value or less.

In the power feed control device of [9], after the failure state, it is possible to allow energization via the opening/closing unit until the current flowing through the element unit reaches the lower limit value or less, and when the current flowing through the element unit has reached the lower limit value or less, it is possible to reliably prevent backflow in the element unit.

[10] The power feed control device according to [6], in which the predetermined condition is that a current output from the voltage conversion unit to the third conductive path after the failure state has reached a reference value or more.

In the power feed control device of [10], after the failure state, it is possible to allow energization via the opening/closing unit until the current output from the voltage conversion unit to the third conductive path reaches the reference value or more, and when the current output from the voltage conversion unit to the third conductive path has reached the reference value or more, it is possible to reliably prevent backflow in the element unit.

[11] The power feed control device according to any one of [2] to [10], in which the control unit causes the voltage conversion unit to perform the conversion operation of applying the output voltage of the first value to the third conductive path in a normal state where power supplied from the power supply unit to the power path is not in the failure state, and in which the switch unit blocks a current from flowing from the third conductive path to the power path in the OFF state.

The power feed control device of [11] can cause the voltage conversion unit to perform the conversion operation in the normal state to prepare for the failure state, and can block the current from flowing from the voltage conversion unit into the power path when such preparation is performed.

[12] The power feed control device according to any one of [1] to [10], in which the switch unit includes a second diode having an anode electrically connected to the third conductive path and a cathode electrically connected to the power path, and in which a current flows from the third conductive path side to the power path side via the second diode when a voltage of the power path is less than a voltage of the third conductive path by a certain value or more when the switch unit is in an OFF state.

In the power feed control device of [12], when the potential of the power path decreases by a certain value or more with respect to the potential of the third conductive path, a current can be immediately supplied even when the switch unit is in the OFF state.

First Embodiment

Outline of In-Vehicle System

Figure 1:
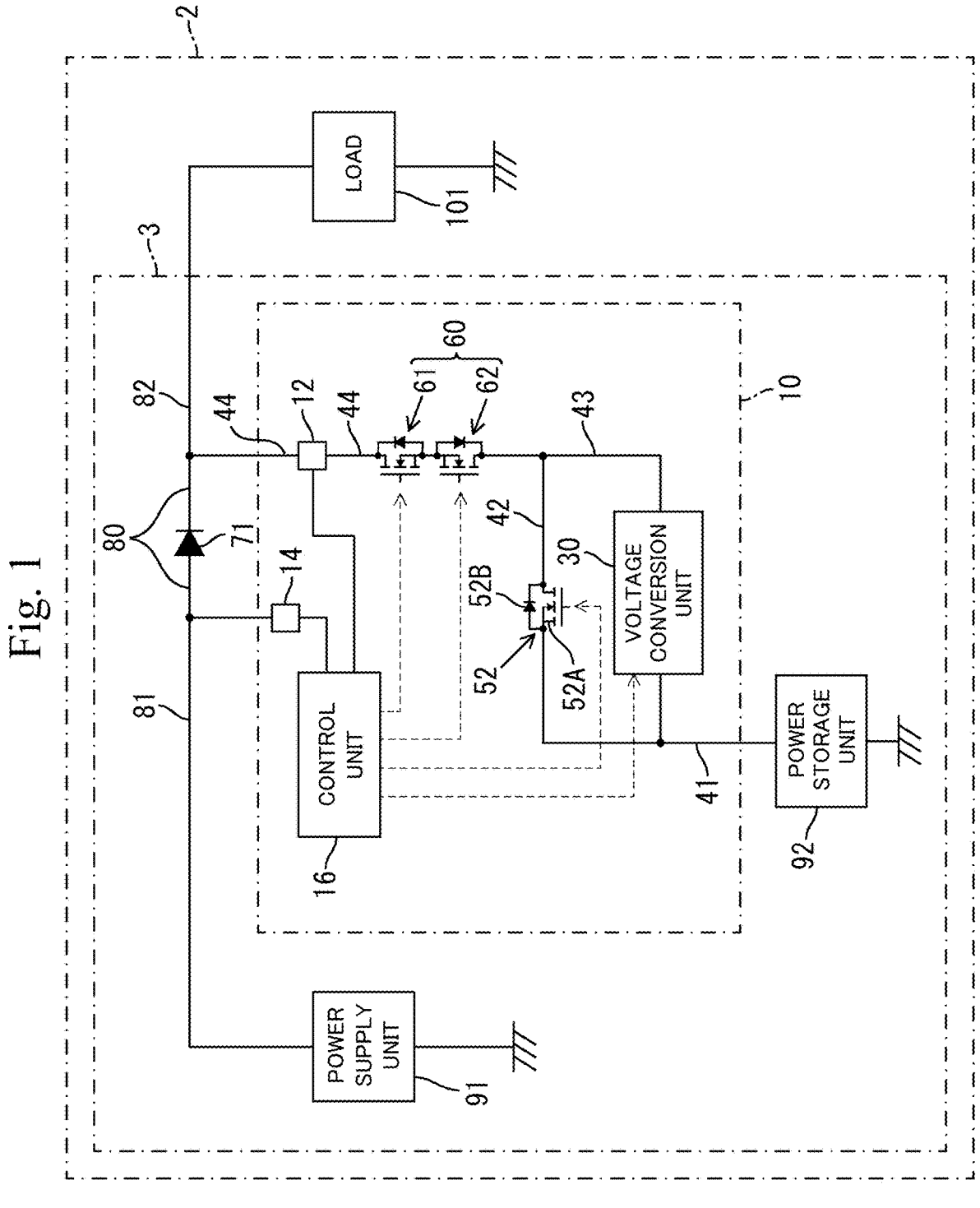
FIG. 1 is a circuit diagram schematically illustrating an example of an in-vehicle system including a power feed control device according to a first embodiment.

FIG. 1 illustrates an in-vehicle system 2. The in-vehicle system 2 of FIG. 1 mainly includes an in-vehicle power supply system 3 and a load 101. The in-vehicle power supply system 3 is also referred to as a power supply system 3 in the following description. The in-vehicle system 2 is a system that supplies power to a load 101 by the power supply system 3 to operate the load 101. In FIG. 1, the load 101 is exemplified as an example of the in-vehicle load, but other loads may be provided in the in-vehicle system 2.

The load 101 is an electric component mounted on a vehicle. The load 101 operates by receiving power supplied via a power path 80. The type of the load 101 is not limited. As the load 101, various known in-vehicle components can be adopted. The load 101 may have multiple electrical components or may be a single electrical component.

The power supply system 3 is a system that supplies power to the load 101. The power supply system 3 supplies power to the load 101 using a power supply unit 91 or a power storage unit 92 as a power supply source. The power supply system 3 can supply power from the power supply unit 91 to the load 101, and for example, when power supply from the power supply unit 91 is interrupted due to a failure or the like, power can be supplied from the power storage unit 92 to the load 101.

Outline of Power Supply System

The power supply system 3 includes the power supply unit 91, the power storage unit 92, a power feed control device 10, the power path 80, a diode 71, and the like.

The power supply unit 91 is an in-vehicle power supply that can supply power to the load 101. The power supply unit 91 is configured as, for example, a known in-vehicle battery such as a lead battery. The power supply unit 91 may be constituted by a battery other than a lead battery, and may have a power supply means other than a battery, instead of the battery or in addition to the battery. The positive electrode of the power supply unit 91 is electrically connected to a first power path 81 which is a part of the power path 80, to be short-circuited to the first power path 81. The negative electrode of the power supply unit 91 is electrically connected to the ground to be short-circuited to the ground. The power supply unit 91 applies a certain value of DC voltage to the first power path 81. The voltage applied to the first power path 81 by the power supply unit 91 may fluctuate a little from the certain value.

The power storage unit 92 is a power source different from the power supply unit 91. The power storage unit 92 is a power supply serving as a power supply source at least when power supply from the power supply unit 91 is interrupted. The power storage unit 92 includes, for example, a known power storage means such as an electric double layer capacitor (EDLC). The power storage unit 92 may include a capacitor other than the electric double layer capacitor, or may include another power storage means (such as a battery) instead of the capacitor or in addition to the capacitor. The positive electrode of the power storage unit 92 is electrically connected to the first conductive path 41 to be short-circuited to the first conductive path 41. The negative electrode of the power storage unit 92 is electrically connected to the ground to be short-circuited to the ground. The output voltage of the power storage unit 92 (the voltage applied to the first conductive path 41 by the power storage unit 92) may be larger or smaller than the output voltage of the power supply unit 91 (the voltage applied to first power path 81 by the power supply unit 91).

In the present specification, unless otherwise specified, the voltage is a voltage with respect to a ground potential (for example, 0 V), and is a potential difference from the ground potential. For example, the voltage applied to the first power path 81 is a potential difference between the potential of the first power path 81 and the ground potential.

The voltage applied to the first conductive path 41 is a potential difference between the potential of the first conductive path 41 and the ground potential.

The power path 80 is a path through which power based on the power supply unit 91 is transmitted, and is a path through which power based on the power supply unit 91 is supplied to the load 101. In the example of FIG. 1, the power path 80 includes a first power path 81 provided closer to the power supply unit 91 than the diode 71 and a second power path 82 provided closer to the load 101 than the diode 71. A voltage that is the same as or substantially the same as the output voltage of the power supply unit 91 is applied to the first power path 81. One end of the first power path 81 is electrically connected to the positive electrode of the power supply unit 91 to be short-circuited to the positive electrode of the power supply unit 91. The other end of the first power path 81 is electrically connected to the anode of the diode 71. The first power path 81 may be provided with a relay or a fuse. One end of the second power path 82 is electrically connected to the cathode of the diode 71. In the example of FIG. 1, the second power path 82 is short-circuited to one end of the load 101.

The diode 71 is an element interposed in the power path 80. The diode 71 allows a current to flow from the first power path 81 side to the second power path 82 side in the power path 80, and blocks the current from flowing from the second power path 82 side to the first power path 81 side. The diode 71 has a function of preventing a current from flowing from the second power path 82 side to the first power path 81 side when the voltage of the first power path 81 significantly decreases compared to the voltage of the second power path 82 due to occurrence of a failure state described later.

Details of Power Feed Control Device

The power feed control device 10 is a device that is used in the in-vehicle system 2 and controls power feeding from the power storage unit 92. The power feed control device 10 is a backup device that can output power based on the power storage unit 92. The power feed control device 10 includes a first conductive path 41, a second conductive path 42, a third conductive path 43, a fourth conductive path 44, a control unit 16, a voltage conversion unit 30, an element unit 52, a switch unit 60, a current detection unit 12, a voltage detection unit 14, and the like.

The first conductive path 41 is a conductive path electrically connected to one end of the element unit 52. In the example of FIG. 1, one end of the first conductive path 41 is short-circuited to one end of the element unit 52, and the other end of the first conductive path 41 is short-circuited to the positive electrode of the power storage unit 92 which is one end of the power storage unit 92. A voltage based on the output of the power storage unit 92 is applied to the first conductive path 41. In the example of FIG. 1, the potential of the first conductive path 41, the potential of the source of the field effect transistor (FET) constituting the element unit 52, the potential of an anode of a diode 52B, and one end (positive electrode) of the power storage unit 92 are set to the same potential.

The second conductive path 42 is a conductive path electrically connected to the other end of the element unit 52. The second conductive path 42 forms an energization path between the element unit 52 and the power path 80. In the example of FIG. 1, one end of the second conductive path 42 is short-circuited to the other end of the element unit 52, and the other end of the second conductive path 42 is short-circuited to the third conductive path 43. In the example of FIG. 1, the potential of the second conductive path 42, the potential of the drain of the element unit 52, the potential of the cathode of the diode 52B, and the potential of the third conductive path 43 are set to the same potential. The second conductive path 42 is electrically connected to a conductive path (third conductive path 43) disposed between the switch unit 60 and the voltage conversion unit 30. In FIG. 1, a connection point between the second conductive path 42 and the third conductive path 43 is denoted by reference sign P1.

The third conductive path 43 is a conductive path disposed between the voltage conversion unit 30 and the switch unit 60. The third conductive path 43 is electrically connected to the voltage conversion unit 30 between the voltage conversion unit 30 and the power path 80. In the example of FIG. 1, one end of the third conductive path 43 is electrically connected to the voltage conversion unit 30, and the other end of the third conductive path 43 is electrically connected to the switch unit 60.

The fourth conductive path 44 is a conductive path disposed between the switch unit 60 and the power path 80. In the example of FIG. 1, one end of the fourth conductive path 44 is electrically connected to the switch unit 60, and the other end of the fourth conductive path 44 is electrically connected to the power path 80. In FIG. 1, a connection point between the fourth conductive path 44 and the power path 80 is indicated by reference sign P2.

The element unit 52 is an element provided between the first conductive path 41 and the second conductive path 42. One end of the element unit 52 is electrically connected to the first conductive path 41. The other end of the element unit 52 is electrically connected to the second conductive path 42. The element unit 52 is configured to allow a current to flow to the power path 80 side via itself, and is configured to be able to block a current from flowing to the power storage unit 92 side via itself. In the example of FIG. 1, the element unit 52 is configured as an N-channel FET, and includes the diode 52B configured as a body diode, and an opening/closing unit 52A provided in parallel with the diode 52B. In the example of FIG. 1, the opening/closing unit 52A is, in the element unit 52 configured as an FET, a portion excluding a portion configured as a body diode, and is a portion in which bidirectional energization is allowed in the ON state and bidirectional energization is blocked in the OFF state. With such a configuration, a voltage based on the output of the power storage unit 92 is applied to the anode of the diode 52B. A cathode of the diode 52B is electrically connected to the second conductive path 42.

The switch unit 60 is a switch provided between the third conductive path 43 and the power path 80. In the example of FIG. 1, the switch unit 60 includes a switch element 61 and a switch element 62 configured as an N-channel FET. The drain of the switch element 61 is electrically connected to the fourth conductive path 44. The direction of the body diode of the switch element 61 is such that the power path 80 side is the cathode side, and no current flows from the power path 80 side to the third conductive path 43 side via the body diode. The drain of the switch element 62 is electrically connected to the third conductive path 43. The direction of the body diode of the switch element 62 is such that the third conductive path 43 side is the cathode side, and no current flows from the third conductive path 43 side to the power path 80 side via the body diode. In the example of FIG. 1, the ON state of the switch unit 60 means that both the switch element 61 and the switch element 62 are in the ON state, and the OFF state of the switch unit 60 means that both the switch element 61 and the switch element 62 are in the OFF state. When the switch unit 60 is in the OFF state, since both the switch elements 61 and 62 are in the OFF state, the switch unit 60 blocks the flow of the current from the power path 80 to the third conductive path 43. When the switch unit 60 is in the ON state, since both the switch elements 61 and 62 are in the ON state, the switch unit 60 allows energization between the third conductive path 43 and the power path 80 via itself.

In the example of FIG. 1, in both cases where the switch unit 60 is in the ON state and in the OFF state, the second conductive path 42 and the third conductive path 43 are short-circuited without via the switch unit 60.

The voltage conversion unit 30 is a device that can increase or decrease an input voltage. In the example of FIG. 1, the voltage conversion unit 30 is connected in parallel to the element unit 52 between the power storage unit 92 and the power path 80. The voltage conversion unit 30 includes, for example, a known voltage conversion circuit such as a DC-DC converter. In the example of FIG. 1, the voltage conversion unit 30 performs voltage conversion between the first conductive path 41 and the third conductive path 43. The voltage conversion unit 30 can perform a first conversion operation of decreasing or increasing the DC voltage applied to the first conductive path 41 and applying an output voltage to the third conductive path 43. During the first conversion operation, the DC voltage applied to the first conductive path 41 is an input voltage based on power from the power storage unit 92. The voltage conversion unit 30 may also have a function of performing the second conversion operation of increasing or decreasing the voltage applied to the third conductive path 43 to apply the voltage to the first conductive path 41, that is, a function of performing bidirectional voltage conversion. The operation of the voltage conversion unit 30 is controlled by the control unit 16. The voltage conversion unit 30 includes a voltage sensor capable of detecting the value of the voltage of the third conductive path 43 and a current sensor capable of detecting the value of the current flowing through the third conductive path 43, and the control unit 16 acquires information from these sensors to specify the value of the current flowing through the third conductive path 43 and the value of the voltage of the third conductive path 43.

The control unit 16 is a device that controls the voltage conversion unit 30, the element unit 52, and the switch unit 60. The control unit 16 includes an information processing device having an information processing function, an arithmetic function, a control function, and the like, and may be configured by the information processing device or may be configured by the information processing device and another device. For example, in the control unit 16, a common control device may control all of the voltage conversion unit 30, the element unit 52, and the switch unit 60, or separate devices may each control the voltage conversion unit 30, the element unit 52, and the switch unit 60.

The voltage detection unit 14 is a circuit that gives to the control unit 16 a detection value (for example, an analog voltage value) that can specify the value of the voltage applied to the power path 80. The voltage detection unit 14 may be a circuit that inputs to the control unit 16 the same voltage value as the value of the voltage applied to the power path 80, or may be a circuit that inputs to the control unit 16 a value proportional to the value of the voltage applied to the power path 80. For example, the voltage detection unit 14 is a voltage dividing circuit, and a value obtained by dividing the value of the voltage applied to the first power path 81 by the voltage dividing circuit is input to the control unit 16 as a detection value. The control unit 16 specifies the value of the voltage applied to the first power path 81 based on the detection value input from the voltage detection unit 14.

The current detection unit 12 is a current sensor that detects a value of a current flowing through the fourth conductive path 44. The detection value input from the current detection unit 12 to the control unit 16 is information that can specify the value of the current flowing through the fourth conductive path 44. The control unit 16 specifies the value of the current flowing through the fourth conductive path 44 based on the detection value input from the current detection unit 12.

Operation of Power Feed Control Device

Figure 2:
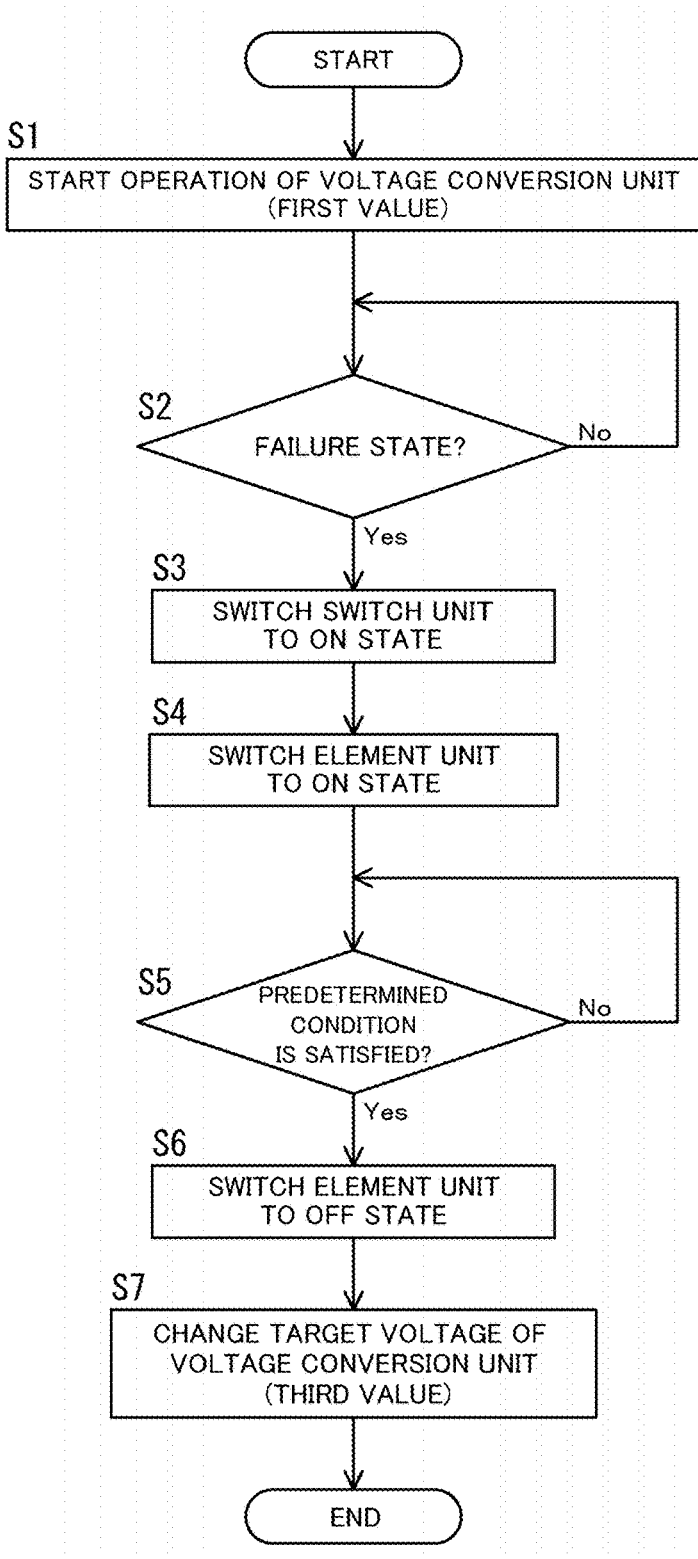
FIG. 2 is a flowchart illustrating a flow of backup control performed in the power feed control device according to the first embodiment.

The following description relates to control for a backup operation performed by the power feed control device 10. FIG. 2 is a flowchart illustrating a flow of control for a backup operation. FIG. 3 is a graph specifically showing changes in voltage and current when the control of FIG. 2 is performed.

The control unit 16 starts the control for the backup operation illustrated in FIG. 2 when a predetermined start condition is satisfied. The above-described "start condition" may be, for example, a condition that "the vehicle is in a starting state", or may be other conditions. In the representative example described below, the control unit 16 determines that the start condition is satisfied when the vehicle on which the in-vehicle system 2 is mounted is in the starting state, and starts the control for the backup operation illustrated in FIG. 2. "When the vehicle is in a starting state" is, for example, when a starting switch such as an ignition switch in a hybrid vehicle or a power switch in an electric vehicle is turned on.

When starting the control for the backup operation illustrated in FIG. 2, the control unit 16 causes the voltage conversion unit 30 to start the conversion operation (voltage increasing operation or voltage decreasing operation) so as to apply the output voltage of the target value to the third conductive path with a first value V1 as the target value. In a case where the control unit 16 causes the voltage conversion unit 30 to start the conversion operation with the first value V1 as the target value in step S1, the conversion operation with the first value V1 as the target value is continued until a predetermined end condition is satisfied or the processing of step S7 is executed. The predetermined end condition is, for example, that the starting switch of the vehicle is turned off. When the predetermined end condition is satisfied, the control in FIG. 2 is forcibly stopped.

After starting the conversion operation in step S1, the control unit 16 determines whether a predetermined failure state has occurred, in step S2. The failure state is an abnormal state in which the supply of power from the power supply unit 91 to the power path 80 has decreased to a predetermined level or stopped. Various known methods can be adopted as a method for determining the failure state. In the representative example described below, a state in which the voltage of the first power path 81 has decreased to a threshold value or less is the failure state. The threshold value in this case is smaller than the output voltage at the time of full charge of the power supply unit 91, and is a value of 0 V or more.

When it is determined in step S2 that the failure state has not occurred, the control unit 16 determines No in step S1 and repeats the determination in step S1. In the example of FIG. 2, after the control of FIG. 2 is started, as long as the failure state does not occur, the determination of the failure state is continuously repeated until the above-described predetermined end condition is satisfied. In the representative example described below, the control unit 16 maintains both the switch unit 60 and the element unit 52 in the OFF state while the failure state does not occur.

When it is determined in step 2 that the failure state has occurred (Yes in step S2), the control unit 16 switches the switch unit 60 to the ON state in step S3. In this way, when the power supply from the power supply unit 91 to the power path 80 becomes the failure state, the control unit 16 switches the switch unit 60 to the ON state, and also continues to cause the voltage conversion unit 30 to perform the conversion operation with the first value as the target value (conversion operation of bringing the output voltage applied to the third conductive path 43 close to the first value).

For example, FIG. 3 shows an example in which the control of FIG. 2 is started at time 0 and the above-described failure state occurs at a time t1. In the example of FIG. 3, the switch unit 60 is switched to the ON state at a timing of a time t2 after the time t1. Note that the times on the horizontal axes in the upper graph and the lower graph in FIG. 3 correspond to each other, and the timings of the time t1 to a time t5 in the upper graph and the lower graph correspond to each other. In the upper graph in FIG. 3, a bold solid line is a voltage applied to the second conductive path 42 and the third conductive path 43.

In the upper graph of FIG. 3, a thick broken line is a voltage obtained by subtracting, from the value of the voltage applied to the first conductive path 41, the voltage drop generated in the element unit 52, and corresponds to the second value. That is, the thick broken line indicates a change in the second value. When the opening/closing unit 52A is in the ON state, the second value is a first subtraction value which is obtained by subtracting, from the value of the voltage applied to the first conductive path 41, the value of the voltage drop generated in the opening/closing unit 52A and the diode 52B. When the opening/closing unit 52A is in the OFF state, the second value is a second subtraction value which is obtained by subtracting, from the value of the voltage applied to the first conductive path 41, the value of the voltage drop generated in the diode 52B. In the present embodiment, the first value V1 is larger than the second value, and specifically, the first value V1 is larger than both of the first subtraction value and the second subtraction value. In the present embodiment, when the voltage of the second conductive path 42 is equal to or less than the second value in the above-described failure state, a current flows from the power storage unit 92 side to the power path 80 side via the element unit 52.

In the upper graph of FIG. 3, a thin solid line indicates the lower limit (lower limit voltage) of the voltage required for the load. In the example of FIG. 3, the first value V1 is 15 V. In FIG. 3, Vb is a second subtraction value in a period A1, which is a value obtained by subtracting a value Vf of the voltage drop generated in the diode 52B from the value of the voltage applied to the first conductive path 41 when the opening/closing unit 52A is in the OFF state in the period A1. In the example of FIG. 3, Vb is 10.8 V. In FIG. 3, V3 corresponds to an example of a third value. In the example of FIG. 3, V3 is 10.2 V.

In the example of FIG. 3, the voltage conversion operation for outputting the first value V1 is continued before the time t2, and therefore, when the control unit 16 sets the switch unit 60 in the ON state in step S3 and the switch unit 60 is switched to the ON state at the time t2, the current from the voltage conversion unit 30 gradually increases as in the lower graph of FIG. 3, but it is difficult to immediately supply a large current when the load responsiveness of the voltage conversion unit 30 is low. Specifically, as shown in the upper graph of FIG. 3, although the target value of the voltage conversion unit 30 is maintained at the first value V1 before and after the time t2, the output voltage actually applied from the voltage conversion unit 30 to the third conductive path 43 decreases immediately after the time t2, and the current flows into the second conductive path 42 via the element unit 52. That is, immediately after the time t2, the voltage conversion unit 30 cannot output a very large current, but a large current can be supplied via the element unit 52. Immediately after the time t2, a voltage having a value obtained by subtracting the value Vf of the voltage drop generated in the diode 52B from the value of the output voltage of the power storage unit 92 (voltage applied to the first conductive path 41) at the time t2 is applied to the second conductive path 42 and the third conductive path 43. Then, as time elapses from the time t2, the voltage applied to the third conductive path 43 by the voltage conversion unit 30 increases, and the current supplied to the third conductive path 43 by the voltage conversion unit 30 also increases.

After setting the switch unit 60 in the ON state in step S3, the control unit 16 switches the element unit 52 to the ON state in step S4. When such switching is performed, energization via the opening/closing unit 52A and energization via the diode 52B are allowed in the element unit 52, so that energization where loss is reduced is enabled. The control by the control unit 16 to switch the element unit 52 to the ON state may be performed simultaneously with step S3 or before step S3.

In the control unit 16, a portion for executing the control in step S4 may be different from a portion for executing the control in step S1 and a portion for executing the control in step S3. In a case where the portion dedicated for executing the control in step S4 is provided, the dedicated portion may be configured, for example, to be able to detect the current flowing through the diode 52B, and may maintain the element unit 52 in the OFF state when no current flows through the diode 52B, and execute step S4 to switch the element unit 52 to the ON state when the current flows through the diode 52B.

After step S4, the control unit 16 determines whether the predetermined condition is satisfied, in step S5. After steps S3 and S4 are performed, the determination of No is repeated in step S5 until the predetermined condition is satisfied, and the determination of step S5 is repeated. The predetermined condition is, for example, that "the voltage of the second conductive path has reached a predetermined value equal to or more than the voltage of the first conductive path". In a representative example, the predetermined value is the voltage of the first conductive path. That is, in the representative example, the predetermined condition is that "the voltage of the second conductive path has reached the voltage of the first conductive path or more". The predetermined value may be another value larger than the voltage of the first conductive path.

After steps S3 and S4 are performed, when determining that the predetermined condition is satisfied (Yes in step S5), the control unit 16 switches the element unit 52 to the OFF state in step S6. When such switching is performed, energization via the opening/closing unit 52A is blocked in the element unit 52, and only energization via the diode 52B is allowed. In the example of FIG. 3, the magnitude of the voltage of the second conductive path 42 and the voltage of the first conductive path 41 is switched at the timing of the time t3, and the voltage of the second conductive path 42 reaches the voltage of the first conductive path 41 at the timing of the time t3. Therefore, the element unit 52 is switched to the OFF state immediately after the time t3. In this way, when the predetermined condition is satisfied after the above-described failure state occurs, the power feed control device 10 operates such that the flow of the current from the second conductive path 42 side to the power storage unit 92 side is blocked in the element unit 52.

After switching the element unit 52 to the OFF state in step S6, the control unit 16 switches the target value of the voltage conversion unit 30 to a third value V3 smaller than the first value V1, in step S7. In this way, in the case where the failure state occurs, after the control unit 16 causes the voltage conversion unit 30 to perform the conversion operation of applying the output voltage of the first value V1 to the third conductive path 43, the control unit 16 causes the voltage conversion unit 30 to perform the conversion operation of applying the output voltage of the third value V3 to the third conductive path 43. The third value V3 is larger than the second value (value obtained by subtracting the voltage drop in the element unit 52 from the voltage of the first conductive path 41) at the time of switching to the third value V3 in step S6, and is larger than the subsequent second value. Therefore, inflow of the current via the element unit 52 is inhibited. The timing at which the control unit 16 executes step S7 may be a timing at which the voltages of the second conductive path 42 and the third conductive path 43 have reached the first value V1, or may be a timing after a predetermined time has elapsed since the voltages of the second conductive path 42 and the third conductive path 43 have reached the first value V1.

As described above, when the normal state (not the failure state) is changed to the failure state, the control unit 16 operates to set the switch unit 60 in the ON state and set the opening/closing unit 52A in the ON state. Then, after switching the switch unit 60 to the ON state, when a predetermined condition is satisfied while the voltage conversion unit 30 is performing the conversion operation, the control unit 16 operates to switch the opening/closing unit 52A to the OFF state. Furthermore, after switching the opening/closing unit 52A to the OFF state, the control unit 16 causes the voltage conversion unit 30 to perform a conversion operation of applying the output voltage of the third value V3 to the third conductive path 43. The third value V3 is set to be a value larger than the second subtraction value after the target value is switched to the third value V3 in step S7.

Examples of Effects

When performing a backup operation of supplying power based on the power storage unit 92, the power feed control device 10 can use a path via the element unit 52 and a path via the voltage conversion unit 30. For example, at a time when sufficient power supply is not performed by the path via the voltage conversion unit 30, the power feed control device 10 can respond to promptly supply power using the path via the element unit 52. On the other hand, when the output voltage of the power storage unit 92 decreases, it is possible to perform a voltage increasing operation by the voltage conversion unit 30 and perform a backup operation so as to apply a desired output voltage to the third conductive path 43. Furthermore, when the switch unit 60 is in the OFF state, the power feed control device 10 can block the current from flowing from the power path 80 side into the voltage conversion unit 30 side, and when the switch unit 60 is in the ON state, it is possible to reduce the loss when feeding the current toward the power path 80.

The power feed control device 10 is configured such that a current flows from the power storage unit 92 side to the power path 80 side via the element unit 52 when the voltage of the second conductive path 42 is equal to or less than the second value in the failure state. That is, at a time when the output of the voltage conversion unit 30 does not rise to "the extent that the voltage of the second conductive path 42 exceeds the second value", the power based on the power storage unit 92 can be supplied to the power path 80 side via the element unit 52, so that the current can be supplemented by the path via the element unit 52 at a time when the output of the voltage conversion unit 30 is low. Furthermore, when the supply of power from the power supply unit 91 to the power path 80 is in the normal state that is not the failure state, the control unit 16 can set the switch unit 60 in the OFF state. This can block the current from flowing from the power path 80 side into the voltage conversion unit 30 side. Furthermore, after the failure state occurs, it is possible to block the current from flowing in the element unit 52 from the second conductive path 42 side to the power storage unit 92 side, and therefore, while such a blocking function is exerted, it is possible to prevent the current based on the output from the voltage conversion unit 30 from flowing from the second conductive path 42 side into the power storage unit 92 side.

When the failure state occurs, the power feed control device 10 can perform voltage conversion so as to apply an output voltage of the first value to the third conductive path 43, and then switch the voltage conversion so as to apply an output voltage of the third value which is less than the first value. Therefore, after a certain period of time has elapsed, the power feed control device 10 can reduce the voltage output from the voltage conversion unit 30 to reduce the output energy.

When the failure state occurs, the power feed control device 10 can perform voltage conversion so as to apply the output voltage of the first value larger than the second value, and can operate so as to bring the voltage of the third conductive path 43 close to a relatively high target voltage (first value) at an early stage. Furthermore, after a certain period of time has elapsed from the failure state, the power feed control device 10 can reduce the output energy by reducing the voltage output from the voltage conversion unit 30 to the third value smaller than the first value. Since the third value is larger than the second value, inflow of the current to the second conductive path 42 side via the element unit 52 is inhibited.

In the power feed control device 10, the element unit 52 is configured such that the diode 52B and the opening/closing unit 52A are provided in parallel, the anode of the diode 52B is connected to the first conductive path 41, and the cathode is connected to the second conductive path 42. Therefore, in the element unit 52, even when the opening/closing unit 52A is in the OFF state, when the voltage of the second conductive path 42 is less than the voltage of the first conductive path 41 by a certain value or more, the current is continuously permitted to flow from the first conductive path 41 to the second conductive path 42, and when the opening/closing unit 52A is in the ON state, energization via the opening/closing unit 52A is permitted. Furthermore, when the normal state is changed to the failure state, the power feed control device 10 sets the opening/closing unit 52A in the ON state, so that larger electric power can be supplied at an earlier stage via the element unit 52 while reducing the loss in the element unit 52. Furthermore, after switching the switch unit 60 to the ON state, the power feed control device 10 switches the opening/closing unit 52A to the OFF state in response to satisfaction of a predetermined condition during the conversion operation. Therefore, after the voltage conversion operation progresses until the predetermined condition is satisfied, the power feed control device 10 can prevent the current from flowing back in the element unit 52. Furthermore, after switching the opening/closing unit 52A to the OFF state, the power feed control device 10 causes the voltage conversion unit 30 to perform a conversion operation of applying an output voltage of the third value (a value smaller than the first value and larger than the second subtraction value) to the third conductive path 43. Therefore, after a certain period of time has elapsed, the power feed control device 10 can continue the power supply by the output operation of the voltage conversion unit 30 with reduced energy while reliably reducing the current in the forward direction in the diode 52B.

The above predetermined condition may be that the voltage conversion unit 30 outputs the output voltage of the first value. In this case, the power feed control device 10 can continue energization via the opening/closing unit 52A until the output voltage applied to the third conductive path 43 rises to the first value after the failure state, and can reliably prevent backflow in the element unit 52 after the output voltage has risen to the first value.

The power feed control device 10 can cause the voltage conversion unit 30 to perform the conversion operation in the normal state to prepare for the failure state, and can block the current from flowing from the voltage conversion unit 30 into the power path 80 by blocking the bidirectional energization in the switch unit 60 when such preparation is performed.

Modified Example 1 of First Embodiment

In the representative example of the first embodiment, an example of the predetermined condition is shown, but the predetermined condition may be that "a predetermined time has elapsed since the voltage conversion unit 30 starts to output a current to the third conductive path 43 after the above-described failure state". Modified Example 1 can have the same contents as those of the first embodiment except for the predetermined condition.

In this power feed control device 10, after the above-described failure state, it is possible to continue energization via the opening/closing unit 52A until a predetermined time elapses since the voltage conversion unit 30 starts to output the current, and after the predetermined time elapses, it is possible to reliably prevent backflow in the element unit 52.

Modified Example 2 of First Embodiment

In the representative example of the first embodiment, an example of the predetermined condition is shown, but the predetermined condition may be that "the current flowing through the element unit 52 has reached the lower limit value or less". Modified Example 2 can have the same contents as those of the first embodiment except for the predetermined condition.

In this power feed control device 10, after the above-described failure state, it is possible to allow energization via the opening/closing unit 52A until the current flowing through the element unit 52 reaches the lower limit value or less, and when the current flowing through the element unit 52 has reached the lower limit value or less, it is possible to reliably prevent backflow in the element unit 52.

Modified Example 3 of First Embodiment

In the representative example of the first embodiment, an example of the predetermined condition is shown, but the predetermined condition may be that "the current output from the voltage conversion unit 30 to the third conductive path 43 after the above-described failure state has reached the reference value or more". Modified Example 3 can have the same contents as those of the first embodiment except for the predetermined condition.

In this power feed control device 10, after the above-described failure state, it is possible to allow energization via the opening/closing unit 52A until the current output from the voltage conversion unit 30 to the third conductive path 43 reaches the reference value or more, and when the current output from the voltage conversion unit 30 to the third conductive path 43 has reached the reference value or more, it is possible to reliably prevent backflow in the element unit 52.

Second Embodiment

The following description relates to a second embodiment.

A power feed control device 210 according to the second embodiment illustrated in FIG. 4 is different from the power feed control device 10 according to the first embodiment only in that the switch element 62 is omitted from the configuration of FIG. 1, and is the same as the power feed control device 10 according to the first embodiment in the other points.

As illustrated in FIG. 4, in the power feed control device 210 according to the second embodiment, the switch element 61 corresponds to a switch unit. The body diode of the switch element 61 corresponds to an example of a second diode, and the body diode has an anode electrically connected to the third conductive path 43 and a cathode electrically connected to the power path 80. The cathode of the body diode may be short-circuited so as to have the same potential as the second power path 82, or may be connected via the current detection unit 12 as illustrated in FIG. 4. In the configuration of FIG. 4, when the voltage of the power path 80 decreases by a certain value or more with respect to the voltage of the third conductive path 43 when the switch unit 60 is in the OFF state, a current flows from the third conductive path 43 side to the power path 80 side via the body diode. The control for the backup operation performed by the power feed control device 210 according to the second embodiment is the same as that of the first embodiment, and is performed by the flow as illustrated in FIG. 2.

Third Embodiment

The following description relates to a third embodiment.

A power feed control device 310 according to the third embodiment illustrated in FIG. 5 is different from the power feed control device 10 according to the first embodiment only in that the position of the switch unit 60 is changed from the configuration of FIG. 1, and is similar to the power feed control device 10 according to the first embodiment in the other points.

In the power feed control device 310 of FIG. 5, the other end of the second conductive path 42 is electrically connected to the fourth conductive path 44. In this configuration, when the switch unit 60 is in the ON state, the second conductive path 42 and the third conductive path 43 are short-circuited via the switch unit 60. The control for the backup operation performed by the power feed control device 310 according to the third embodiment is the same as that of the first embodiment, and is performed by the flow as illustrated in FIG. 2.

OTHER EMBODIMENTS

The present disclosure is not limited to the embodiments described with reference to the above description and drawings. For example, the features of the above-described or later-described embodiments can be combined in any manner within a range not contradictory. In addition, any of the features of the above-described or later-described embodiments can be omitted unless clearly indicated as being essential. Furthermore, the above-described embodiments may be modified as follows.

In the above-described embodiments, the power storage unit 92 is provided outside the power feed control device 10, but the power storage unit 92 may be included in the power feed control device 10.

In the above-described embodiments, the switch unit 60 is configured by the FET. However, the switch unit may be configured by a semiconductor switch other than the FET, or may be configured by a mechanical relay.

In the above-described embodiments, a case where the voltage of the first power path 81 decreases to the threshold value or less is defined as a failure state, but the present invention is not limited to this example. For example, a case where there is a decrease in voltage exceeding a specified value within a predetermined time in the first power path 81 may be defined as a failure state, and determination may be made by other determination methods.

In the above-described embodiments, the diode 71 is provided, but a switch such as an FET may be provided instead of the diode 71. In this case, it is sufficient to have a configuration in which the switch is immediately blocked when the failure state occurs.

In the above-described embodiments, the element unit 52 is configured by an FET, but the element unit may be configured such that a diode is provided instead of the FET, an anode of the diode is connected to the first conductive path 41, and a cathode is connected to the second conductive path 42. In this case, in the control of FIG. 2, the processing of steps S4 and S6 may be omitted.

In the above-described embodiments, the second conductive path 42 and the third conductive path 43 are short-circuited via or without via the switch unit when the switch unit 60 is in the ON state, and the above-described second value is a value obtained by subtracting, from a value of a voltage applied to the first conductive path 41, a value of a voltage drop generated in the element unit 52 when a current flows from the first conductive path 41 to the second conductive path 42 in the element unit 52. In the above-described embodiments having such a configuration, the third value is smaller than the first value and larger than the second value, but the present invention is not limited to this example, and the third value may be smaller than the first value and smaller than the second value. Specifically, in the case where the second value is a value obtained by subtracting, from the value of the voltage applied to the first conductive path 41, "the value of the voltage drop generated in the element unit 52 when a current flows from the first conductive path 41 to the second conductive path 42 while the element unit 52 is in ON state", the third value may be smaller than the second value. In this example, while adopting the same hardware configuration as that of any of the above embodiments, the processing of step S7 of FIG. 2 may be changed such that the third value is smaller than the second value, or may be changed as follows. For example, the element unit 52 may be changed from the configuration of FIG. 1 of the first embodiment to a configuration in which bidirectional energization is blocked in the OFF state and bidirectional energization is allowed in the ON state (for example, the same configuration as the switch unit 60), and then the bidirectional energization may be blocked in the element unit by setting the element unit in the OFF state in step S6 of FIG. 2, and then the third value may be changed to be smaller than the first value and smaller than the second value in step S7. In this example, after a certain period of time has elapsed from the failure state, the output energy can be reduced by reducing the voltage output from the voltage conversion unit to the third value, and the output energy can be further reduced by setting the third value to a value smaller than the second value. At this time, in the element unit, inflow from the first conductive path 41 side to the second conductive path 42 side is blocked.

It should be considered that the embodiments disclosed herein are examples in all respects and are not restrictive. The scope of the present invention is not limited to the embodiments disclosed herein, but is indicated by the claims, and is intended to include all modifications within the meaning and scope equivalent to the claims.

The invention claimed is:

1. A power feed control device used in an in-vehicle system including a power supply unit that supplies power, a power path that is a path through which power based on the power supply unit is transmitted, and a power storage unit different from the power supply unit, the power feed control device controlling power feeding from the power storage unit, the power feed control device comprising:

a first conductive path to which a voltage based on an output of the power storage unit is applied;

an element unit of which one end is electrically connected to one end of the first conductive path;

a second conductive path electrically connected to the other end of the element unit and forming an energization path between the element unit and the power path;

a voltage conversion unit connected in parallel to the element unit between the power storage unit and the power path, the voltage conversion unit performing a conversion operation of increasing or decreasing an input voltage based on power from the power storage unit;

a third conductive path electrically connected to the voltage conversion unit between the voltage conversion unit and the power path;

a switch unit provided between the third conductive path and the power path; and a control unit that controls the voltage conversion unit, wherein the other end of the first conductive path is electrically connected to a positive electrode of the power storage unit, wherein the element unit is configured to be able to allow a current to flow to the power path side via the element unit, and is configured to be able to block a current from flowing to the power storage unit side via the element unit, wherein the second conductive path is electrically connected to a conductive path disposed between the switch unit and the voltage conversion unit or between the switch unit and the power path, and wherein the switch unit blocks a current from flowing from the power path to the third conductive path when the switch unit is in an OFF state, and allows energization through the switch unit between the third conductive path and the power path when the switch unit is in an ON state.

2. The power feed control device according to claim 1, wherein, when power supply from the power supply unit to the power path becomes a failure state, the control unit switches the switch unit to the ON state, and also causes the voltage conversion unit to perform the conversion operation so as to apply an output voltage of a first value to the third conductive path, wherein, when a voltage of the second conductive path is equal to or less than a second value in the failure state, a current flows from the power storage unit side to the power path side via the element unit, and wherein a current is blocked from flowing in the element unit from the second conductive path side to the power storage unit side at least after the failure state occurs.

3. The power feed control device according to claim 2, wherein, in a case where the failure state occurs, the control unit causes the voltage conversion unit to perform the conversion operation of applying the output voltage of the first value to the third conductive path, and then causes the voltage conversion unit to perform the conversion operation of applying the output voltage of a third value smaller than the first value to the third conductive path.

4. The power feed control device according to claim 3, wherein the second conductive path and the third conductive path are short-circuited via or without via the switch unit when the switch unit is in an ON state, wherein the second value is a value obtained by subtracting, from a value of a voltage applied to the first conductive path, a value of a voltage drop generated in the element unit, wherein the first value is larger than the second value, and wherein the third value is smaller than the first value and larger than the second value.

5. The power feed control device according to claim 3, wherein the second conductive path and the third conductive path are short-circuited via or without via the switch unit when the switch unit is in an ON state, wherein the second value is a value obtained by subtracting, from a value of a voltage applied to the first conductive path, a value of a voltage drop generated in the element unit when a current flows in the element unit from the first conductive path to the second conductive path, and wherein the third value is smaller than the first value and smaller than the second value.

6. The power feed control device according to claim 4, wherein the element unit includes a diode and an opening/closing unit provided in parallel to the diode, wherein a voltage based on an output of the power storage unit is applied to an anode of the diode, wherein a cathode of the diode is electrically connected to the second conductive path, wherein bidirectional energization is allowed when the opening/closing unit is in an ON state, wherein, when the opening/closing unit is in an ON state, the second value is a first subtraction value obtained by subtracting, from a value of a voltage applied to the first conductive path, a value of a voltage drop generated in the opening/closing unit and the diode, and when the opening/closing unit is in an OFF state, the second value is a second subtraction value obtained by subtracting, from a value of a voltage applied to the first conductive path, a value of a voltage drop generated in the diode, wherein the first value is larger than either the first subtraction value or the second subtraction value, wherein, when supply of power from the power supply unit to the power path is changed from a normal state that is not the failure state to the failure state, the control unit sets the switch unit in the ON state and sets the opening/closing unit in the ON state, then after switching the switch unit to the ON state, the control unit switches the opening/closing unit to the OFF state when a predetermined condition is satisfied while the voltage conversion unit is performing the conversion operation, and then after switching the opening/closing unit to the OFF state, the control unit causes the voltage conversion unit to perform the conversion operation of applying the output voltage of the third value to the third conductive path, and wherein the third value is larger than the second subtraction value.

7. The power feed control device according to claim 6, wherein the predetermined condition is that the voltage of the second conductive path has reached a predetermined value equal to or more than a voltage of the first conductive path.

8. The power feed control device according to claim 6, wherein the predetermined condition is that a predetermined time has elapsed since the voltage conversion unit starts to output a current to the third conductive path after the failure state.

9. The power feed control device according to claim 6, wherein the predetermined condition is that a current flowing through the element unit has reached a lower limit value or less.

10. The power feed control device according to claim 6, wherein the predetermined condition is that a current output from the voltage conversion unit to the third conductive path after the failure state has reached a reference value or more.

11. The power feed control device according to claim 2, wherein the control unit causes the voltage conversion unit to perform the conversion operation of applying the output voltage of the first value to the third conductive path in a normal state where power supplied from the power supply unit to the power path is not in the failure state, and wherein the switch unit blocks a current from flowing from the third conductive path to the power path in the OFF state.

12. The power feed control device according claim 1, wherein the switch unit includes a second diode having an anode electrically connected to the third conductive path and a cathode electrically connected to the power path, and wherein a current flows from the third conductive path side to the power path side via the second diode when a voltage of the power path is less than a voltage of the third conductive path by a certain value or more when the switch unit is in an OFF state.

* * * * *